(12) United States Patent
Stougie et al.

(10) Patent No.: US 8,386,840 B2
(45) Date of Patent: Feb. 26, 2013

(54) DISTRIBUTED OBJECT STORAGE SYSTEM

(75) Inventors: Bastiaan Stougie, Melle (BE); Frederik De Schrijver, Wenduine (BE); Romain Raymond Agnes Slootmaekers, Heverlee (BE); Kristof Mark Guy De Spiegeleer, Knokke-Heist (BE); Wim De Wispelaere, Ghent (BE); Wouter Van Eetvelde, Sint-Amandsberg (BE); Joost Yervante Damad, Hulshout (BE)

(73) Assignee: Amplidata NV, Lochristi (BE)

( * ) Notice: Subject to any disclaimer, the term of this patent is extended or adjusted under 35 U.S.C. 154(b) by 0 days.

(21) Appl. No.: 13/283,650

(22) Filed: Oct. 28, 2011

(65) Prior Publication Data
US 2012/0166487 A1 Jun. 28, 2012

Related U.S. Application Data

(60) Provisional application No. 61/427,330, filed on Dec. 27, 2010, provisional application No. 61/427,334, filed on Dec. 27, 2010, provisional application No. 61/427,339, filed on Dec. 27, 2010.

(51) Int. Cl.
*G06F 11/00* (2006.01)
(52) U.S. Cl. .................................. 714/6.2; 714/6.24
(58) Field of Classification Search ............... 714/6.2
See application file for complete search history.

(56) References Cited

U.S. PATENT DOCUMENTS

| 7,146,521 | B1 | 12/2006 | Nguyen |
| 7,418,620 | B1 | 8/2008 | Tormasov et al. |
| 7,536,693 | B1 | 5/2009 | Manczak et al. |
| 7,577,767 | B1 | 8/2009 | Robillard et al. |
| 8,145,941 | B2 * | 3/2012 | Jacobson ............... 714/6.24 |
| 8,281,182 | B2 * | 10/2012 | Resch et al. .............. 714/6.2 |
| 2002/0078244 | A1 | 6/2002 | Howard |
| 2003/0188097 | A1 | 10/2003 | Holland et al. |
| 2006/0106878 | A1 | 5/2006 | Shitomi et al. |
| 2007/0136525 | A1 | 6/2007 | Read |
| 2007/0214314 | A1 | 9/2007 | Reuter |
| 2008/0313241 | A1 | 12/2008 | Li et al. |
| 2011/0113282 | A1 | 5/2011 | De Spiegeleer et al. |

FOREIGN PATENT DOCUMENTS

| EP | 2469413 A1 | 6/2012 |
| WO | 99/08173 A2 | 2/1999 |
| WO | 2009135630 | 11/2009 |
| WO | 2010091101 | 8/2010 |
| WO | 2011/113504 A1 | 9/2011 |
| WO | 2012/089701 A1 | 7/2012 |
| WO | 2012/089727 A1 | 7/2012 |

OTHER PUBLICATIONS

Ganger et al., "Storage Area Networking—Object-Based Storage", IEEE Communications Magazine, IEEE Service Center, vol. 41, No. 8, Aug. 1, 2003, XP011099971, pp. 84-90.
Ansi: "SCSI Object-Based Storage Device Commands (OSD)", Internet citation, Jul. 30, 2004, XP002474837, retrieved from the Internet: http://www.t10.org/ftp/t10/drafts/osd/osd-r10.pdf, pp. 75-164.

* cited by examiner

*Primary Examiner* — Michael Maskulinski
(74) *Attorney, Agent, or Firm* — Bacon & Thomas, PLLC

(57) ABSTRACT

The invention concerns a distributed object storage system (1) comprising a maintenance agent (740) instructing an encoding module (400) to disassemble a repair data object into a specific number of repair sub blocks, this specific number being equal to or greater than said number of missing sub blocks and less then the predetermined number of sub blocks during a regular storage operation.

42 Claims, 7 Drawing Sheets

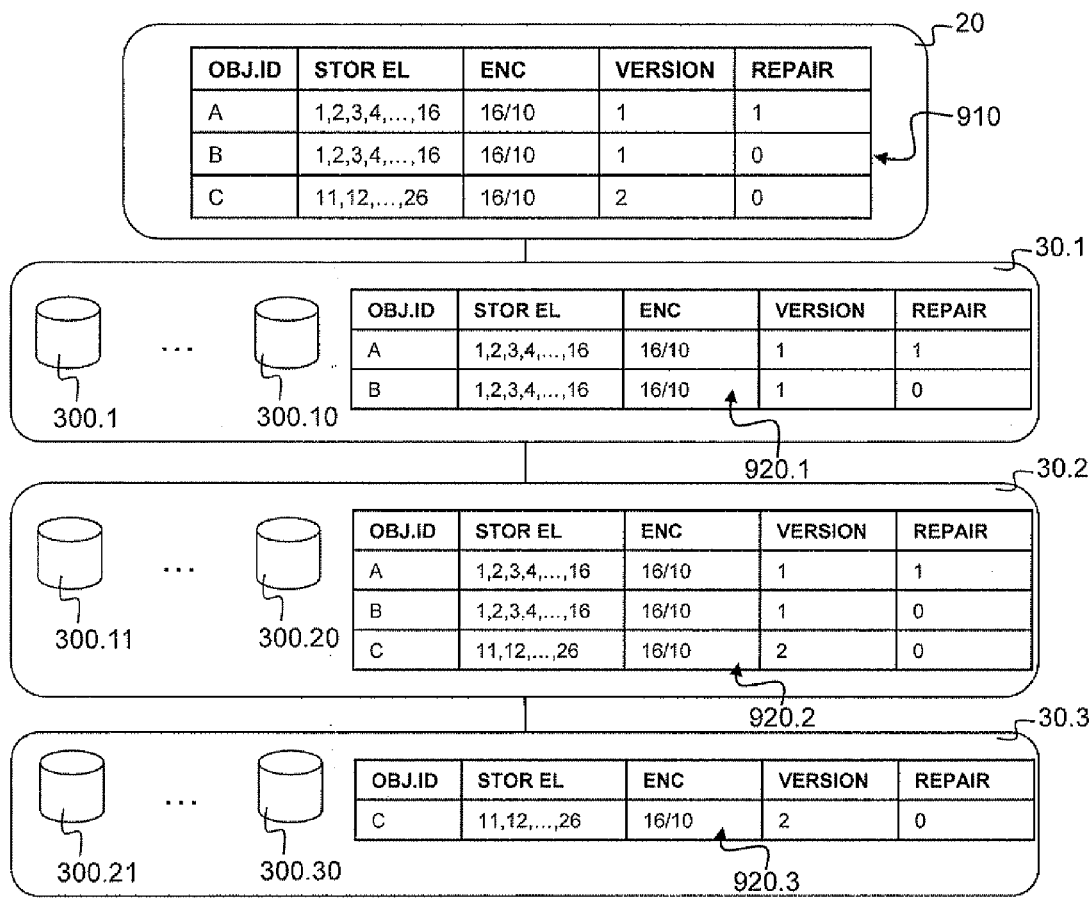

DISTRIBUTED OBJECT STORAGE SYSTEM

FIELD OF THE INVENTION

The present invention generally relates a distributed data storage systems. Typically, such distributed storage systems are targeted at storing large amounts of data, such as objects or files in a distributed and fault tolerant manner with a predetermined level of redundancy. The present invention relates more particularly to a distributed object storage system.

BACKGROUND OF THE INVENTION

The advantages of object storage systems, which store data objects referenced by an object identifier versus file systems, such as for example US2002/0078244, which store files referenced by an inode or block based systems which store data blocks referenced by a block address in terms of scalability and flexibility are well known. Object storage systems in this way are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large scale storage systems are required to distribute the stored data objects in the object storage system over multiple storage elements, such as for example hard disks, or multiple components such as storage nodes comprising a plurality of such storage elements. However as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art, in general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronisation of the different storage elements and require them to be of the same type and in the case of drive failure require immediate replacement, followed by a costly and time consuming rebuild process. Therefor known systems based on replication or known RAID systems are generally not configured to survive more than two concurrent storage element failures. Therefor it has been proposed to use distributed object storage systems that are based on erasure encoding, such as for example described in WO2009135630 or US2007/0136525. Such a distributed object storage system stores the data object in encoded sub blocks that are spread amongst the storage elements in such a way that for example a concurrent failure of six storage elements can be tolerated with a corresponding storage overhead of 60%, that means that 1 GB of data objects only require a storage capacity of 1.6 GB.

Such an erasure encoding based districted object storage system for large scale data storage also requires a form a self-healing functionality in order to restore the required redundancy policy after for example the failure of a storage element. However most in known systems these self-healing methods lack efficiency and consume considerable amounts of processing power and/or network bandwidth in order for example to cope with restoring the redundancy for the stored data objects on a failed storage element. One system that tries to improve efficiency is for example described in WO2010/091101, however this system could result to data loss after subsequent generations of node failure. Furthermore this system is only able to handle the restore of a complete storage element and is not able to handle a more fine grained restore for example of a single data object.

Therefor there still exists a need for an efficient and reliable monitoring and repair process for a distributed object storage system, that does not result in data loss in the long term and is able to realize a large scale, self-healing distributed object storage system.

SUMMARY OF THE INVENTION

According to a first aspect of the invention, there is provided a distributed object storage system comprising:
  a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, wherein said desired spreading width consists of the sum of:
    a minimal spreading requirement, corresponding to the minimal number of storage elements that must store sub blocks of said data object and are not allowed to fail; and
    a maximal concurrent failures tolerance, corresponding to the number of storage elements that must store sub blocks of said data object and are allowed to fail concurrently;
  each one of said redundant sub blocks comprising:
    encoded data of equal size of the data object divided by a factor equal to said predetermined multiple of said minimal spreading requirement; and
    decoding data, such that said data object can be decoded from any combination of said redundant sub blocks of which the number corresponds to predetermined multiple of said minimal spreading requirement.
  a plurality of storage nodes each comprising a share of said plurality of redundant storage elements; and
  at least one controller node, operably connected to or comprised within said storage nodes when storing or retrieving said data object, comprising:
    an encoding module operable to disassemble said data object into said predetermined number of redundant sub blocks;
    a spreading module operable to store said predetermined number of said redundant sub blocks on a number of said storage elements being larger or equal to said desired spreading width;
    a clustering module operable to retrieve at least said predetermined multiple of said minimal spreading requirement of said redundant sub blocks from a plurality of said storage elements; and a decoding module operable to assemble said data object from any combination of said redundant sub blocks of which the number corresponds to said predetermined multiple of said minimal spreading requirement, a monitoring agent, operably connected to said storage nodes when monitoring said data object, and operable to:

provide a repair data object identifier of a repair data object, wherein said repair data object identifier corresponds to said data object identifier and said repair data object corresponds to said data object when said data object is not correctly stored in said distributed object storage system; and subsequently create a repair task comprising said repair object identifier, characterized in that the distributed object storage system further comprises a maintenance agent, operably connected to said controller node when repairing said repair data object, and operable to perform the following steps when executing said repair task:

said maintenance agent determining said repair data object identifier comprised within said repair task;

said maintenance agent instructing said clustering module to retrieve said predetermined number of sub blocks comprising said repair data object identifier, said clustering module subsequently retrieving a number of collected sub blocks equal to or greater then said predetermined multiple of said minimal spreading requirement;

said maintenance agent determining a number of missing sub blocks which corresponds to the number of sub blocks said clustering module is not able to collect;

said maintenance agent instructing said decoding module to assemble said repair data object from said number of collected sub blocks;

said maintenance agent instructing said encoding module to disassemble said repair data object into a specific number of repair sub blocks, this specific number being equal to or greater than said number of missing sub blocks and less then said predetermined number of sub blocks; and said maintenance agent instructing said spreading module to store said number of repair sub blocks, said spreading module subsequently storing said number of repair sub blocks, such that said repair sub blocks and said collected sub blocks are stored on a number of said storage elements that is larger or equal to said desired spreading width.

This enables a distributed object storage system with a self-healing function that does not compromise consistency of the data objects stored, not even on a very large storage capacity scale and in a long term time scale. It does this in a way that requires less computing resources and less network bandwidth then any prior art system while not compromising efficiency in implementing a redundancy policy. The repair agent is in no way required to identify which sub blocks are missing. It is sufficient to determine how many of the sub blocks of a stored data object are missing. This assessment requires only minimal computing and memory resources. Furthermore although reuse can be made of the components of the erasure encoding system like the encoding module or the spreading module a tailored repair retrieval and repair storage operation is available and in this way allows for a specific configuration which is focussed on an efficient repair process without compromising the general retrieval and storage operations.

According to an advantageous embodiment of the invention, said specific number is equal to said number of missing sub blocks augmented by a safety margin.

In this way it is possible to preventively deal with the probability of future repair requirements, while still being more efficient then the regular retrieval and storage operations in the context of a repair operation.

According to an alternative embodiment of the invention, said safety margin is equal to zero.

Although sacrificing preventive action to deal with the probability of future repair requirements, this embodiment results in the most efficient repair operation possible.

According to an embodiment of the invention, said distributed storage system further comprises a metadata storage, said encoding module and/or said spreading module adding to said metadata storage and wherein metadata for said data object stored comprises: said data object identifier; a list of identifiers of the storage elements on which sub blocks of said data object are stored; and an identifier for the type of encoding that was used to disassemble said data object.

This allows to further increase efficiency of the repair storage and repair retrieval operations.

According to an embodiment of the invention said controller node comprises a central metadata storage. The modules for the erasure encoding/decoding functionality such as for example the encoding module, decoding module, clustering module or the spreading module also preferably residing in the controller node in this way are able to access the metadata in the most efficient manner.

According to a specific embodiment said spreading module is operable to add to said central metadata storage said metadata for each data object stored by said controller node, such that the metadata is conveniently update during as well regular storage operations as repair storage operations of a data object.

According to an advantageous embodiment of the invention said plurality of storage nodes, each comprise a local metadata storage, said spreading module adding to said respective local metadata storage, and said metadata for each data object being stored in said corresponding storage node.

In this way it is assured by means of very simple means that the metadata corresponding to a specific data object is stored in the distributed object storage system according to the requirements of the same redundancy policy as this data object is subject to. If for example the data object is required to be stored such that a concurrent failure of 5 storage nodes can be coped with, its associated metadata will also be stored such that this requirement is fulfilled. It is clear that it is not required to encode the metadata to achieve this, it results merely from replicating the metadata for a specific data object locally on as many storage nodes as this specific data object is being stored.

According to a preferred embodiment of the invention, said metadata further comprises a version number that is incremented every time said data object is stored by said spreading module. This allows, especially in the context of a plurality of redundant central and/or local meta data storage facilities to check consistency of the metadata, for example in the case of conflicting metadata in two or more meta data storages.

Optionally, according to a preferred embodiment, said controller node retrieves said metadata from said local metadata storages and adds the metadata for each data object comprising the highest version number to said central metadata storage.

When the controller node is replaced or when the central metadata gets corrupt, the central metadata storage can be restored in this way. Alternatively this also allows for dynamically keeping the central metadata storage consistent with the real world state of the distributed object storage system as reported by the local metadata storage of the storage nodes, which greatly improves long term robustness of the distributes object storage system.

According to an embodiment of the invention, said controller node is operable to consult said metadata storage to determine on which storage elements said sub blocks of said data object can be retrieved. According to first alternative said consultation is a consultation of said central metadata storage, which allows for efficiency. According to a further alternative said consultation is a federated search of one or more of said local metadata storages, which allows for additional robustness as the distributed object storage system can remain operational even if the central metadata storage is not available. Optionally, during said federated search said controller node retrieves said metadata of said local metadata storages that are consulted and adds said metadata for each data object comprising the highest version number to said central metadata storage, which allows to dynamically rebuild or repair a central metadata storage during the federated search operation.

According to an embodiment of the invention, said monitoring agent is operable to monitor availability of said data object by:
  instructing said clustering module to retrieve said predetermined number of said redundant sub blocks; and
  providing said repair data object identifier if at least one of said redundant sub blocks cannot be retrieved.

In this way monitoring the health of the distributed object storage system is possible on every desired scale, down to the level of a single stored data object.

According to an alternative embodiment of the invention said monitoring agent is operable to monitor availability of said data object by:
  checking the status of said storage elements; and
  providing said repair data object identifier if at least one of said redundant sub blocks is stored on a storage element of which the status indicates it is unavailable.

This embodiment enables to efficiently handle such an event as a storage element or an entire storage node in need of repair.

According to still a further alternative embodiment of the invention said monitoring agent is operable to monitor availability of said data object by:
  checking the status of said storage elements;
  storing the status of said storage elements in a central infrastructure database comprising infrastructure metadata, said infrastructure metadata comprising:
    an identifier of each said storage element; and
    the status of each said storage element.
  providing said repair data object identifier if at least one of said redundant sub blocks is stored on a storage element that the infrastructure metadata indicates is unavailable.

Preferably said maintenance agent, when instructing said clustering module to retrieve said predetermined number of sub blocks comprising said repair data object identifier, is operable to further instruct said clustering module to consult said central infrastructure database, said clustering module subsequently retrieving a number of stored sub blocks equal to or greater then said predetermined multiple of said minimal spreading requirement exclusively from said storage elements for which the status in said infrastructure metadata indicates availability.

Alternatively said monitoring agent is operable to provide said repair data object identifier if at least one of said redundant sub blocks is stored on a storage element of which the infrastructure metadata indicates it is unavailable by combining both the metadata of said data object and the infrastructure metadata of said storage elements.

The storage infrastructure metadata enables efficiency, specifically in large scale repair process involving for example at least one complete storage element or one or more storage nodes. As a further advantage this allows to further increase the efficiency of the repair retrieval operation and alternatively allows for a centrally managed monitoring process that only needs to process metadata and thus does not require any storage or retrieval operations with regards to the data objects.

According to a preferred embodiment of the distributed object storage system according to invention:
  said encoding module is further operable to generate a predetermined number of checksums of said redundant sub blocks, when disassembling said data object into said predetermined number of redundant sub blocks;
  said spreading module is further operable to store said predetermined number of checksums together with their corresponding redundant sub blocks on said storage elements; and
  said monitoring agent is operable to monitor availability of said data object by:
    checking said checksums; and
    providing said repair data object identifier if at least one of said redundant sub blocks is stored on a storage element together with an invalid checksum.

This provides the monitoring agent with an efficient and simple mechanism of additionally monitoring the health of a stored data object on the sub block level.

According to a further embodiment of the invention, said distributed storage system further comprises a garbage collection agent, operably connected to said storage nodes when performing a garbage collection operation, and operable to perform the following steps during a garbage collection operation:
  retrieving the object identifier of at least one of said sub blocks stored on said storage element;
  verifying whether said data object corresponding to said retrieved object identifier corresponds to a data object stored in said distributed object storage system; and
  removing said sub blocks for which said verification indicates that said corresponding data object is not stored in said distributed object storage system.

According to a specific embodiment, said verification indicates that said corresponding data object is not stored in said distributed object storage system if said object identifier is not present in said metadata storage.

The garbage collection operation still further increases the level of long term robustness of the distributed object storage system of the invention as it enables such a large scale storage system to reclaim the storage capacity occupied by deprecated data.

According to a second aspect of the invention, there is provided a method for maintaining a distributed object storage system according to the first aspect of the invention,
  characterized in that said method comprises the following steps when executing said repair task:
    said maintenance agent determining said repair data object identifier comprised within said repair task;
    said maintenance agent instructing said clustering module to retrieve said predetermined number of sub blocks comprising said repair data object identifier, said clustering module subsequently retrieving a number of collected sub blocks equal to or greater then said predetermined multiple of said minimal spreading requirement;

said maintenance agent determining a number of missing sub blocks which corresponds to the number of sub blocks said clustering module is not able to collect;

said maintenance agent instructing said decoding module to assemble said repair data object from said number of collected sub blocks;

said maintenance agent instructing said encoding module to disassemble said repair data object into a number of repair sub blocks, which when summed with said number of collected sub blocks is equal to said predetermined number of sub blocks; and said maintenance agent instructing said spreading module to store said number of repair sub blocks, said spreading module subsequently storing said number of repair sub blocks, such that said repair sub blocks and said collected sub blocks are stored on a number of said storage elements being larger or equal to said desired spreading width.

BRIEF DESCRIPTION OF THE DRAWINGS

FIG. 8 schematically illustrates a metadata storage;

FIG. 9 schematically illustrates a central metadata storage and local metadata storage.

DETAILED DESCRIPTION OF EMBODIMENT(S)

Figure 1:
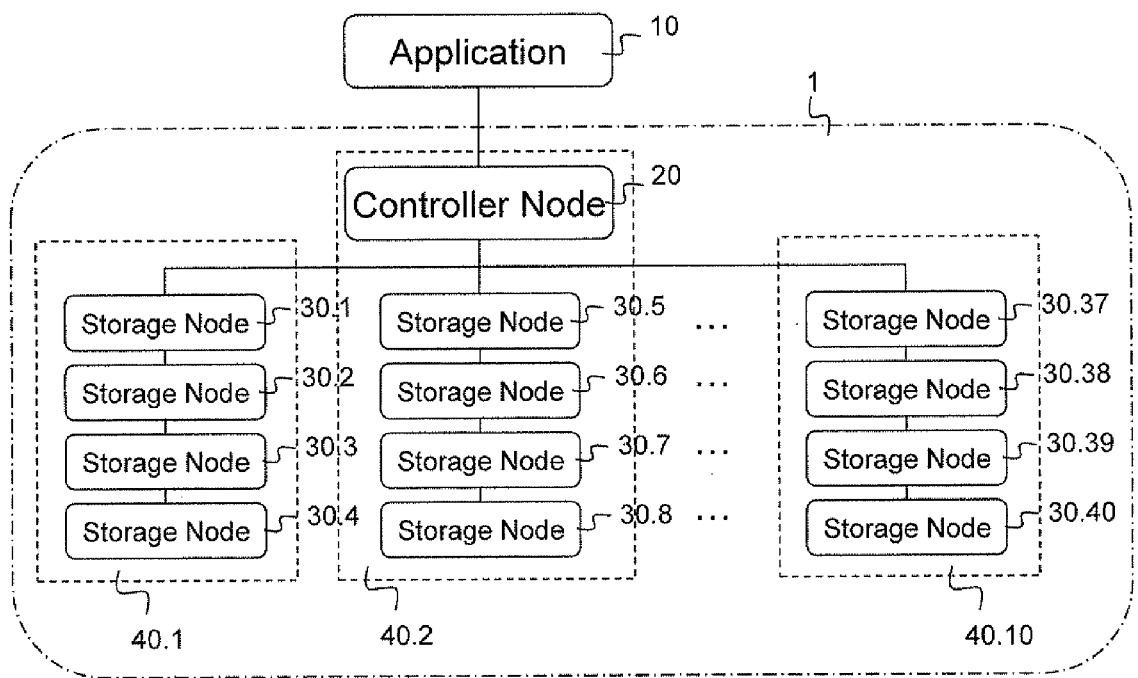
FIG. 1 illustrates a distributed object storage system according to the invention.

FIG. 1 shows a distributed object storage system 1 according to the invention. It is connected to an application 10 for transferring data objects. This connection could be implemented as a suitable data communication network. Such an application could for example be a dedicated software application running on a computing device, such as a personal computer, a lap top, a wireless telephone, a personal digital assistant or any other type of communication device, that is able to interface directly with the distributed object storage system 1, but said application 10 could alternatively comprise a suitable file system which enables a general purpose software application to interface with the distributed object storage system 1 or an Application Programming Interface library. As further shown in FIG. 1 the distributed object storage system comprises a controller node 20 and a plurality of storage nodes 30.1-30.40 all interconnected in a suitable way for transferring data, for example by means of a conventional data communication network such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections.

According to alternative embodiments of the distributed object storage system could comprise any other suitable number of storage nodes 30 and for example two three or more controller nodes 20 also connected to these storage nodes 20. These controller nodes 20 and storage nodes 30 can be built as general purpose computers, however more frequently they are physically adapted for arrangement in large data centres, where they are arranged in modular racks 40 comprising standard dimensions. Particular controller nodes 20 and storage nodes 30, such as for example the Amplistor AS20 storage node as manufactured by Amplidata, are dimensioned to take up a single unit of such rack 40, which is generally referred to as 1U.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
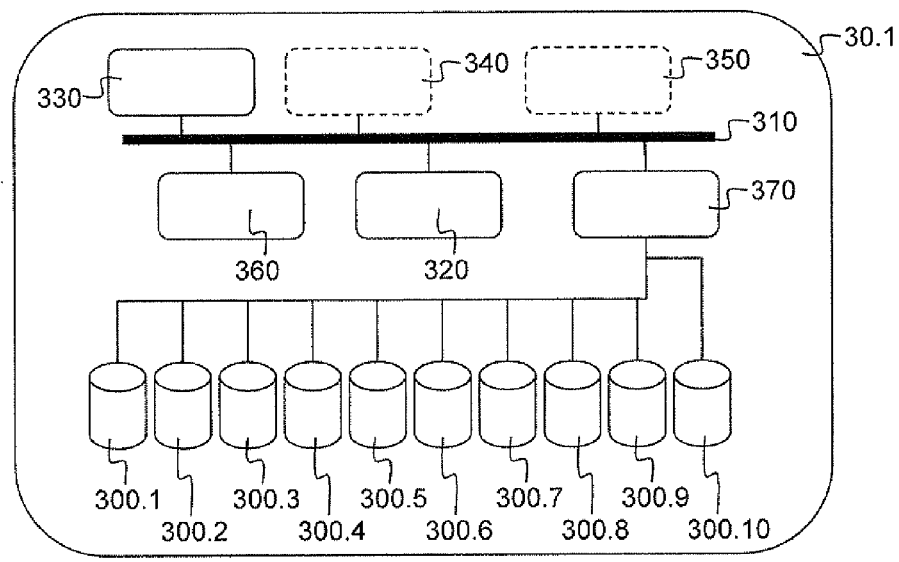
FIG. 2 schematically illustrates a storage node of the distributed object storage system of FIG. 1.

FIG. 2 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for 2TB SATA-II disk drives, and control the reading and writing of data to/from these storage elements 300. In one exemplary embodiment as shown in FIG. 2, such a storage node 30.1 could comprise ten 2TB SATA-II disk drives as storage elements 300.1-300.10 and in this way storage node 30.1 would provide a storage capacity of 20TB to the distributed object storage system 1. According to the exemplary embodiment of FIG. 1 and in the event that storage nodes 30.2-30.40 are identical to storage node 30.1, the distributed object storages system 1 would then have a total storage capacity of 800 TB.

Taking into account FIGS. 1 and 2 the distributed object storage system 1 comprises a plurality of redundant storage elements 300. The storage nodes 30 each comprise a share of these storage elements 300. As shown in FIG. 1 storage node 30.1 comprises ten storage elements 300.1-300.10. Other storage nodes 30 could comprise a similar amount of storage elements, but this is however not essential. Storage node 30.2 could for example comprise eight storage elements 300.11-300.18. As will be explained in further detail below with respect to FIGS. 5 and 6, the distributed object storages system 1 is operable to store and retrieve a data object 500 comprising data 520, for example 64 MB of binary data and a data object identifier 510 for addressing this data object 500, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system. However as will be explained in more detail further below, there is no need for the storage elements 300 to work in synchronism, as is for example the case in many well-known RAID configurations, which sometimes even require disc spindle rotation to be synchronised. Furthermore the independent and redundant operation of the storage elements 300 allows to use any suitable mix of types storage elements 300 to be used in a particular distributed object storage system 1. It is possible to use for example storage elements with differing storage capacity, storage elements of differing manufacturers, using different hardware technology such as for example conventional hard disks and solid state storage elements, using different storage interfaces such as for example different revisions of SATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 3:
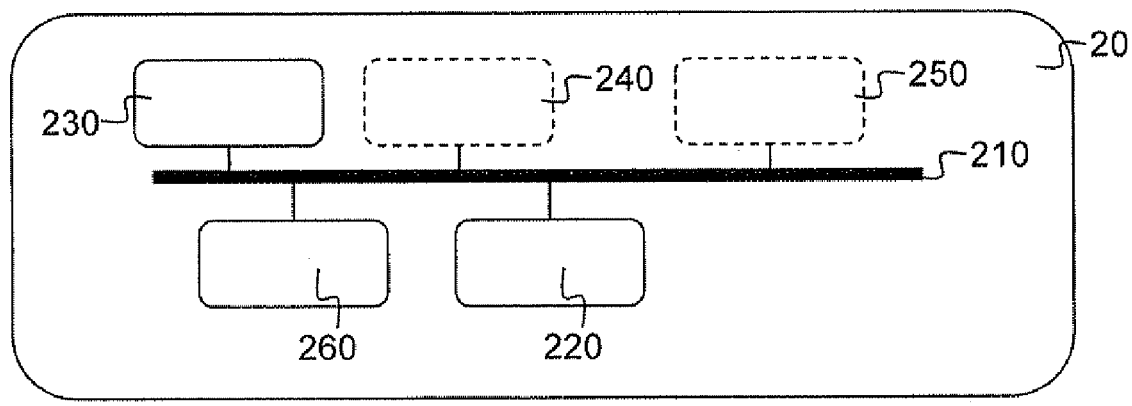
FIG. 3 schematically illustrates a controller node of the distributed object storage system of FIG. 1.

FIG. 3 shows a schematic representation of the controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still a further embodiment the device on which the application 10 runs is a controller node 30.

Figure 4:
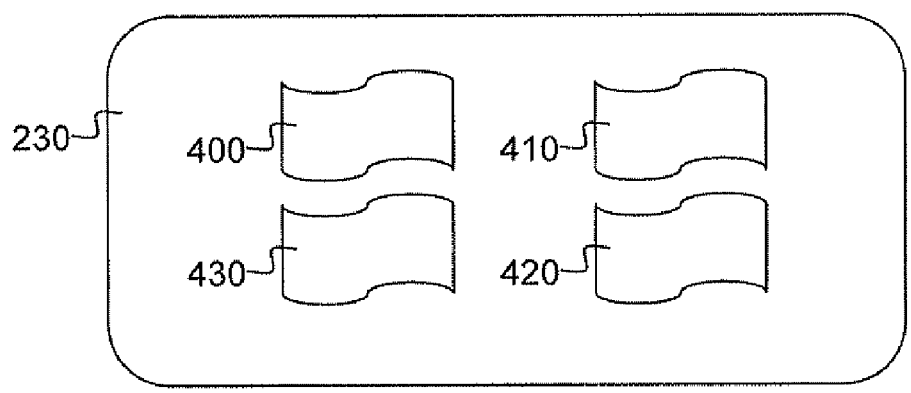
FIG. 4 schematically illustrates some elements of the controller node of FIG. 3 in more detail.

As schematically shown in FIG. 4, controller node 20 comprises four modules: an encoding module 400; a spreading module 410; a clustering module 420; and a decoding module 430. These modules 400, 410, 420, 430 can be implemented as programming instructions stored in local memory 230 of the controller node 20 for execution by its processor 220.

The functioning of these modules 400, 410, 420, 430 will now be explained to FIGS. 5 and 6. The distributed object storage system 1 stores a data object 500 offered by the application 10 in function of a reliability policy which guarantees a level of redundancy. That means that the distributed object storage system 1 must for example guarantee that it will be able to correctly retrieve 500 even if a number of storage elements 300 would be unavailable, for example because they are damaged or inaccessible. Such a reliability policy could for example require the distributed object storage system 1 to be able to retrieve the data object 500 in case of six concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300 is only able to achieve acceptable levels of reliability at the cost of unacceptable levels of overhead. For example, in order to achieve sufficient redundancy to cope with six concurrent failures of storage elements 300, data objects 500 would need to be replicated six times and stored on redundant storage elements 300. This means that next to the master copy of a data object 500 stored on one storage element 300, six replica's must be stored on six other storage elements. As such storing 1 GB of data objects in this way would result in the need of 7 GB of storage capacity in a distributed object storage system, this means an increase in the storage cost by a factor of seven or an additional storage overhead of 600%. Therefor the distributed object storage system 1 according to the invention makes use of erasure coding techniques in order to achieve the requirements of the reliability policy with considerably less overhead. As will be explained in further detail below when using an erasure encoding with a rate of encoding r=10/16 six concurrent failures of storage element 300 can be tolerated, which only require a storage overhead of 60% or a storage cost by a factor of 1.6. This means that storing 1 GB of data objects in this way only results in the need of 1.6 GB of storage capacity in the distributed object storage system 1. Some erasure encoding techniques make use of Reed-Solomon codes, but also fountain codes or rateless erasure codes such as online codes, LDPC codes, raptor codes and numerous other coding schemes are available.

Figure 5:
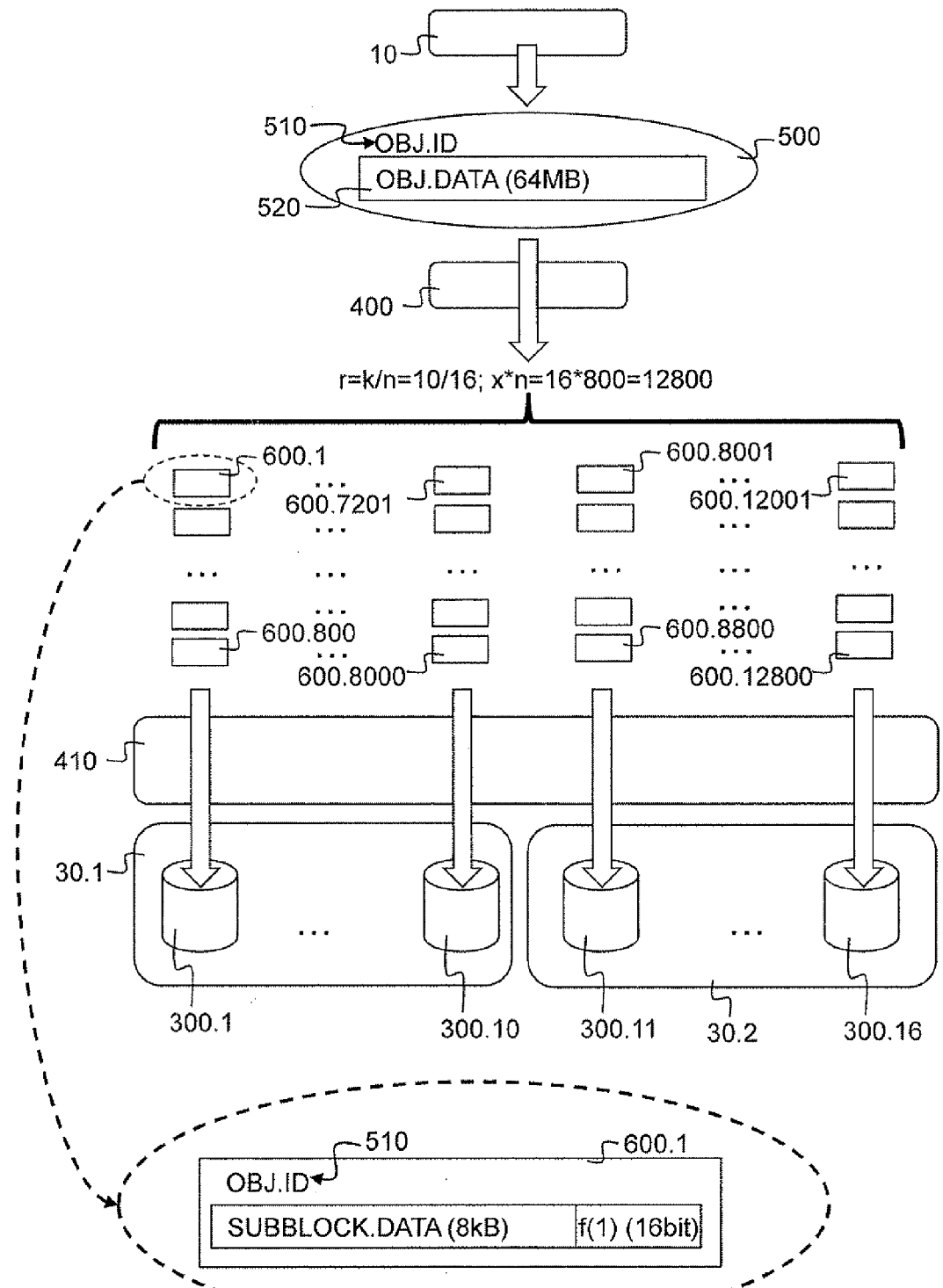
FIG. 5 schematically illustrates a storage operation.

FIG. 5 shows a storage operation performed by an embodiment distributed object storage system 1 that is able to tolerate six concurrent failures of a storage element 300. The data object 500 is offered to the distributed object storage system 1 by the application 10 requesting a storage operation. In this embodiment the data object 500 comprises an object identifier 510, such as for example a GUID, and object data 520, for example consisting of 64 MB of binary data. This data object 500 is offered to the encoding module 400 of the controller node 20. The encoder module 400 will disassemble the data object 500 into a predetermined number x*n=16*800=12800 of redundant sub blocks 600, which also comprise the data object identifier 510. This predetermined number x*n=16*800=12800 corresponds to a predetermined multiple x=800 of a desired spreading width n=16. This desired spreading width n=16=k+f=10+6 consists of the sum of a minimal spreading requirement k=10 and a maximal concurrent failures tolerance f=6. This maximal concurrent failures tolerance f=6 corresponds to the number of storage elements 300 that store sub blocks 600 of said data object 500 and are allowed to fail concurrently as determined by the reliability policy. The minimal spreading requirement k=10, corresponds to the minimal number of storage elements 300 that must store sub blocks 600 of said data object 500 and are not allowed to fail. The encoder module 400 makes use of an erasure encoding scheme to produce these predetermined number x*n=16*800=12800 redundant sub blocks 600.1-600.12800. In this way each one of these redundant sub blocks 600, such as for example sub block 600.1 comprises encoded data of equal size of the data object 500 divided by a factor equal to said predetermined multiple of said minimal spreading requirement x*k=800*10=8000. This means that the size of sub block 600.1 in the example above with a data object of 64 MB will be 8 kB, as this corresponds to 64 MB divided by x*k=800*10=8000. Sub block 600.1 will further comprise decoding data f(1), such that said data object 500 can be decoded from any combination of said redundant sub blocks 600 of which the number x*k=800*10=8000 corresponds to said predetermined multiple x=800 of said minimal spreading requirement k=10. To accomplish this the encoder module 400 will preferably make use of an erasure encoding scheme with a rate of encoding r=k/n=10/16 which corresponds to the minimal spreading requirement k=10 divided by the desired spreading width n=16. In practice this means that the encoder module 400 will first split the data object 500 of 64 MB into x*k=800*10=8000 chunks of 8 kB, subsequently using an erasure encoding scheme with a rate of encoding of r=k/n=10/16 it will generate x*n=800*16=12800 encoded redundant sub blocks 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the sub block 600, such as for example a suitable sub block identifier. Because of the erasure encoding scheme used, namely a rate of encoding r=k/n=10/16, the sub blocks 600.1-600.12800 allow the data object 500 to be decoded from any combination of sub blocks 600 which corresponds to the predetermined multiple of the minimal spreading requirement x*k=800*10=8000, such as for example the combination of sub blocks 600.1-600.4000 and sub blocks 600.8001-600.12000. The storage cost of such an erasure coding scheme is inversely proportional to the rate of encoding and in this particular embodiment will be a factor of 1/r=1/(10/16)=1.6. This means that according to this embodiment of the distributed object storage system 1 of the invention 1 GB of data objects 500 will result in a need for a storage capacity of 1.6 GB.

Subsequently, as shown in FIG. 5, the spreading module 410 will store the predetermined number x*n=800*16=12800 of encoded redundant sub blocks 600.1-600.12800 on a number of storage elements 300 which corresponds to said desired spreading width n=16, such as for example storage elements 300.1-300.16. The spreading module 410 will store on each of these storage elements 300.1-300.16 said predetermined multiple x=800 of these sub blocks 600. As shown in FIG. 5 sub blocks 600.1-600.800 are stored on storage element 300.1, the next x=800 of these sub blocks are stored on storage element 300.2 and so on until the last x=800 of these sub blocks 12001-12800 are stored on storage element 300.16. As shown in FIG. 5 storage elements 300.1-300.10 are arranged in storage node 30.1 and storage elements 300.11-300.16 are arranged in storage node 30.2.

According to an alternative embodiment the sub blocks could be spread by the spreading module 410 on a number of storage elements 300 which is larger than said desired spreading width n=16, for example n+1=16+1=17 storage elements 300. This could be implemented by for example storing sub blocks 600.12001-600.12400 on storage element 300.16 and storing sub blocks 600.12401-12800 on storage element 300.16. It is clear that this would still allow for the storage system 1 to cope with f=6 concurrent failures of storage elements 300. Alternative methods for determining the share of sub blocks to be stored on specific storage elements 300 are well known to the person skilled in the art and are for example described in WO2009135630.

It is clear that according to alternative embodiments of the invention other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the distributed object storage system 1.

According to still a further alternative there could be provided a safety margin to the number of concurrent failures f that a distributed object storage system 1 needs to be able to cope with. In such an embodiment some of the efficiency is traded in for some additional redundancy over what is theoretically required. This preventively increases the tolerance for failures and the time window that is available for a repair activity. However according to a preferred embodiment this safety margin will be rather limited such that it only accounts for an increase in sub blocks that must be generated and stored of for example approximately 10% to 30%, such as for example 20%.

Figure 6:
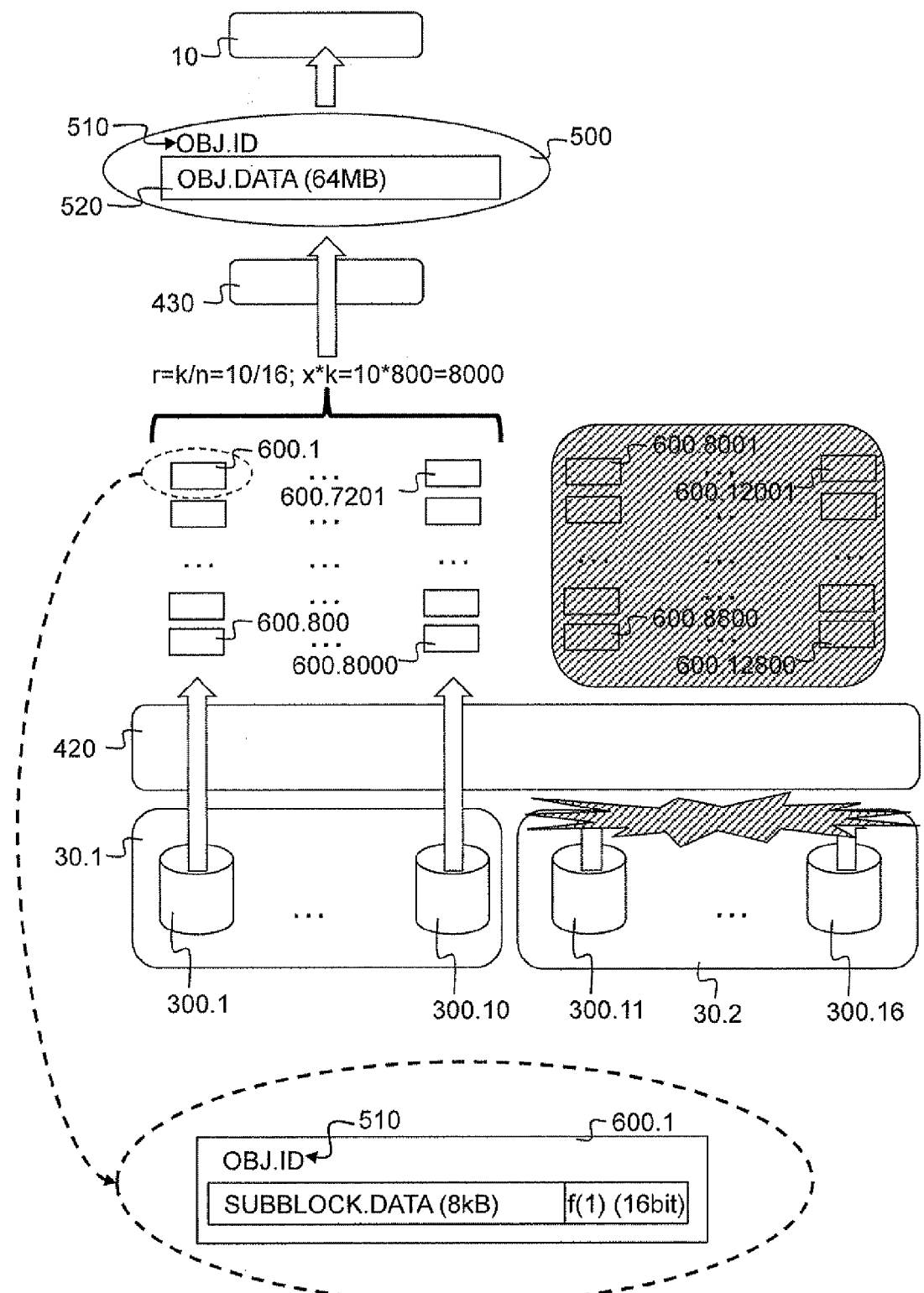
FIG. 6 schematically illustrates a retrieval operation.

FIG. 6 shows a retrieval operation performed by the embodiment of the distributed object storage system 1 as described for the storage operation of FIG. 5 that is able to tolerate six concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 520 of the controller node 20 will initiate the retrieval of the sub blocks 600 associated with this data object identifier. It will try to retrieve the predetermined number x*n=16*800=12800 of redundant sub blocks 600.1-600.12800 that were stored on the storage elements 300.1-300.16. Because of the encoding technology used and the corresponding decoding techniques available, it is sufficient for the clustering module 420, to retrieve said predetermined multiple of said minimal spreading requirement x*k=800*10=8000 of said redundant sub blocks 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the sub blocks 600.1-600.8000 which corresponds to said predetermined multiple of said minimal spreading requirement x*k=800*10=8000.

The retrieved sub blocks 600.1-600.8000 allow the decoding module 430 to assemble data object 500 and offer it to the application 10. It is clear that any number in any combination of the redundant sub blocks 600 corresponding to said data object 500, as long as their number is equal to or larger than the predetermined multiple of the minimal spreading requirement x*k=800*10=8000, would have enabled the decoding module 430 to assemble the data object 500.

Figure 7:
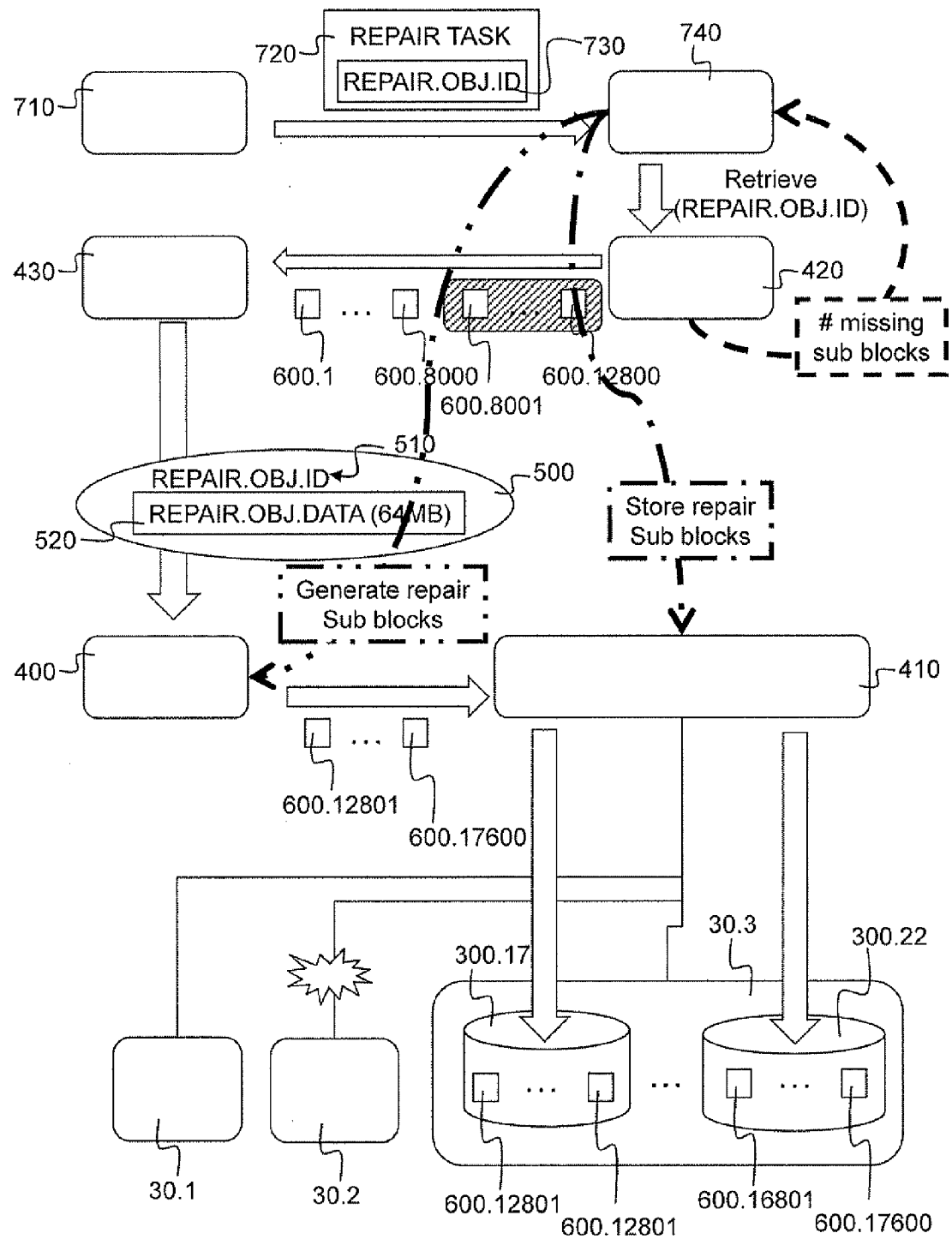
FIG. 7 schematically illustrates a repair operation.

As shown in FIG. 7, the distributed object storage system 1 further comprises a monitoring agent 710 which monitors whether the distributed object storage system 1 still correctly stores all data objects that were offered for storage by the application 10. The monitoring agent 710 could perform this monitoring activity on a periodic basis, for example it could check every storage element 300 every ten days, or it could be triggered by a specific event, such as for example a signal indicating that a particular storage element 300 is not available. The monitoring agent 710 can be implemented as programming instructions stored in local memory 230 of the controller node 20 for execution by its processor 220 or alternatively in local memory 330 of one or more of the storage nodes 30 for execution by their processor 320 or any other suitable combination. Multiple monitoring agent 710s could be active concurrently within a distributed object storage system according to the invention. The only requirement is that the monitoring agent 710 is able to connect to the storage nodes 30 which need to be subject to the monitoring process for data objects 500 being stored in the distributed object storage system 1.

When during the monitoring process the monitoring agent 710 detects a data object 500 that is not correctly stored in the distributed object storage system 1, the monitoring agent 710 will treat the data object identifier 510 of this incorrectly stored data object 500 as a repair data object identifier 730 and will create a repair task 720 comprising this repair data object identifier 730. Repair task 720s created by one or more monitoring agent 710s can for example be aggregated in a suitable programmable storage structure, such as for example a repair task list, in the memory of the controller node 20 or one or more of the storage nodes 30 of the distributed object storage system 1. In this way, for each data object 500 stored in the distributed data storage system 1 in need of repair, a corresponding entry in the repair task list will be available.

As further shown in FIG. 7, the distributed object storage system 1 further comprises a maintenance agent 740 that are able to process a repair task, for example by checking the repair task list on a periodic basis and processing one of the repair tasks in it. Optionally the distributed object storage system 1 comprises a plurality of these maintenance agents 740. The maintenance agent 740 can be implemented as programming instructions stored in local memory 230 of the controller node 20 for execution by its processor 220 or alternatively in local memory 330 of one or more of the storage nodes 30 for execution by their processor 320 or any other suitable combination. The maintenance agent 740 must however be enabled to connect to the controller node 20 in order to process the repair task 720 and thereby repairing the corresponding repair data object stored in the distributed object storage system 1.

The maintenance agent 740 retrieves a repair task 720 that was created by the monitoring agent 710 and determines the corresponding repair data object identifier 730 comprised within this repair task 720. Subsequently the maintenance agent 740 will instruct the clustering module 420 to execute a repair retrieval operation for the repair data object which corresponds to the repair data object identifier. When executing this repair retrieval operation, the clustering module 420 will report back to maintenance agent 740 the number of missing sub blocks 600, which corresponds to the number of sub blocks said clustering module 420 is not able to collect. As such the maintenance agent 740 is able to determine the number of missing sub blocks 600 for this repair data object. For example, a repair task could have been created for the data object 500 as described in FIG. 6, for example because a signal was generated by the distributed object storages system 1 indicating to the monitoring agent that storage node 30.2 was no longer reachable and subsequently the monitoring agent 710 determined that this data object 500 was no longer correctly stored in the distributed object storage system 1. The clustering module 420, when now processing the corresponding repair retrieval operation will initiate an attempt to retrieve the predetermined number x*n=16*800=12800 sub blocks 600.1-600.12800 relating to said repair object identifier. The clustering module 420 will be able to retrieve sub blocks 600.1-600.8000 stored on storage elements 300.1-300.10 that are part of storage node 30.1, while the clustering module 420 will not be able to retrieve sub blocks 600.8001-600.12800 that were stored on storage elements 300.11-300.16 that are part of storage node 30.2. The clustering module 420 in this particular case will report to the maintenance agent 740 that there are 4800 missing sub blocks 600 for this repair object identifier 730. However, as the clustering module 420 was able to retrieve a number of collected sub blocks 600.1-600.8000 equal to or greater then the predetermined multiple of said minimal spreading requirement x*k=800*10=8000, these sub blocks 600.1-600.8000 will subsequently enable the decoding module 430, as instructed by the repair agent 740, to successfully assemble the repair data object 500, as shown in FIG. 7, thereby successfully completing the repair retrieval request.

Subsequently, as shown in FIG. 7, the maintenance agent 740 will initiate a repair storage operation by instructing the encoding module 400 to disassemble this repair data object 500 into a specific number of repair sub blocks 600.12801-600.17600, specific number of repair sub blocks being equal to said number of missing sub blocks 600.8001-600.12800. In this particular example the number of missing sub blocks, as well as this specific number of repair sub blocks being equal to 4800.

It is not necessary to know exactly which sub blocks 600 are missing as the probability of generating repair sub blocks 600 which overlap with the already stored sub blocks 600 is sufficiently low, as the encoding technology, such as for example when based on online codes, makes use of randomly generated numbers, such as for example described in more detail in WO2009135630, which reduces the probability of overlap significantly as is well known to the man skilled in the art. In order to still further reduce the probability of overlap, in the case of online codes, as for example described in WO2009135630, the random number generator could be seeded during the repair storage operation with a seed that is known to be different from the seeds used during a normal storage operation. Alternative examples for generating sub block 600 without a realistic probability of overlap with erasure encoding technology are within the knowledge of the man skilled in the art.

The repair storage operation is finalised by the spreading module 410 which stores this specific number of repair sub blocks 600.12801-600.17600, such that these repair sub blocks and the collected sub blocks 600.1-600.8000 are stored on a number of said storage elements 600 being larger or equal to said desired spreading width n=16. In the example shown in FIG. 7 this is accomplished by the spreading module storing repair sub blocks 600.12801-600.17600 on storage elements 300.17-300.22, the share of sub blocks to be stored on the respective storage elements 300 again being determined according to methods being well known to the person skilled in the art such as for example as shown in FIG. 7 repair sub blocks 600.12801-600.13400 on storage element 300.17, . . . , repair sub blocks 600.16801-600.17600 on storage element 300.22. Alternative methods for determining the share of sub blocks 600 to be stored on specific storage elements 300 are well known to the person skilled in the art and are for example described in WO 2009135630.

It is clear that the maintenance agent 740 is able to process a repair task 720 far more efficiently as compared to prior art systems which make use of the regular retrieval and/or storage operation. There is no need for the maintenance agent of the distributed object storage system 1 according to the invention to determine and keep track of exactly what sub blocks 600 are missing, and as such the repair retrieval operation and repair storage operation can be executed more efficiently than prior art repair processes which focus on restoring the specific sub blocks which are missing or corrupt. Furthermore prior art systems don't provide a tailored retrieval or storage operation for the repair operation and as such a fall back on the regular retrieval and storage process, the latter of which will store said predetermined number x*n=800*16=12800 of sub blocks 600 and will thus consume more resources, such as processing power for the encoding module 400, network bandwidth for the spreading module and storage capacity of the storage elements 30 of the distributed object storage system.

It is clear that the maintenance agent 740 will still be able to process a repair task 720 more efficiently then prior art systems when the number of repair sub blocks generated is equal to the number of missing sub blocks augmented by a safety margin. In such an embodiment some of the efficiency is traded in for some additional redundancy in order to preventively cope with future repair needs. As long as the number of missing sub blocks augmented by the safety margin is less then said predetermined number the repair process will be more efficient then known systems, however according to a preferred embodiment this safety margin will be a rather limited amount, such as for example an integer value approximating a share of 10% to 20% of the number of missing sub blocks. It is clear however that the most efficient repair process can be achieved when the safety margin is equal to zero.

According to a preferred embodiment of the invention as shown in FIG. 8 the distributed storage system 1 comprises a metadata storage 900. During a storage operation the encoding module 400 and/or the spreading module 410 add for every data object 500 they store a respective entry for its data object identifier; a list of identifiers of the storage elements 300 on which sub blocks 600 of this data object 500 are stored; and an identifier for the type of encoding policy that was used to disassemble this data object 500. Preferably the controller node 20 comprises such a metadata storage 900 which is for example implemented as a suitable programmable storage facility in its memory 230 as this allows the encoding module 400, spreading module 410, clustering module 420 and decoding module 430 optimal access to this centrally arranged metadata storage, which will be referred to as a central metadata storage, during storage, retrieval and repair operations. According to a particular embodiment of the invention, the spreading module 410 will add to this central metadata storage 910 the metadata for each data object 500 stored by the controller node 20 comprising this central metadata storage 910. As shown in FIGS. 8 and 9 such a central metadata storage 910 comprises for example metadata for three data objects 500, schematically identified as A, B and C, this metadata comprising the data object identifier in the 'OBJ ID' column, a list of the identifiers of the storage elements storing where the sub blocks of the respective data objects 500 were stored by the spreading module 410 in the 'STOR EL' column, and the encoding policy used by the encoding module 400 in the 'ENC' column. Amongst other things, the central metadata storage 910 allows for efficient retrieval as the clustering module 420 is able to ascertain from the central metadata storage 910 which also resides centrally in the controller node 20 on which specific storage elements a specific data object 500 is stored. It also allows the decoding module 430 to efficiently ascertain which encoding policy was used. Alternatively such a central metadata storage 910 also allows for flexibility in the determination of encoding policies on a per data object basis, this means that the redundancy policy does not need to be fixed for all data objects stored in the distributed object storage systems, but can be set individually for each specific data object.

According to the embodiment of the distributed object storage system 1 shown in FIG. 9, comprises a controller node 20 connected to three storage nodes 30.1-30.3, each comprising ten storage elements respectively 300.1-300.10, 300.11-300.20, 300.21-300.30. These three storage nodes 30.1-30.3, each comprise a local metadata storage 920.1-920.3 which is implemented as a similar storage facility as the central metadata storage 910, but resides in the memory 330 of the respective storage node 30. The spreading module 430 add to the respective local metadata storage 920, the metadata for each data object 500 stored in the corresponding storage node 30. In the schematic example of FIGS. 8 and 9, the central metadata storage 910 comprises the metadata of data objects A, B and C, however the local metadata storage 920.1 of storage node 30.1 only comprises meta data for the data objects 500 for which the spreading module 410 has stored sub blocks 600 on any one of the storage elements 300.1-300.10, namely A and B. The local metadata storage 920.2 comprises metadata for the data objects for which the spreading module 410 has stored sub blocks 600 on any of the storage elements 300.11-300.20, namely A, B and C. comprises metadata for the data objects for which the spreading module 410 has stored sub blocks 600 on any of the storage elements 300.21-300.30, namely C. This embodiment allows the metadata to be spread amongst the controller node 20 and all storage nodes 30 of the distributed object storage system and in this way avoids the central metadata storage 910 from being a bottleneck and/or a single point of failure. It is clear that the metadata in this way is stored in the distributed object storage system in such a way that it will fulfil the requirements of the same redundancy policy as for the corresponding data objects.

According to a preferred embodiment of the metadata storage 900 as shown in FIGS. 8 and 9, the metadata further comprises a version number, as shown in the column 'VERSION' that is incremented every time the respective data object 500 is stored by said spreading module, this could be during a regular storage operation or during a repair storage operation. This version number adds further reliability to the metadata storage 900. For example in the case where controller node 20 needs to be replaced or where its central metadata storage 910 is inaccessible or corrupt for example as detected by a process running a verification check on the metadata storage 900, a new central metadata storage 910 can be constructed by aggregating all metadata available in the local metadata storage 920 of the storage nodes 30. However it could be that, for example as the result of a repair operation, some of the storage nodes 30 still comprise sub blocks 600 and associated metadata for a data object 500 that was subsequently updated. This outdated metadata could conflict with the correct metadata for these data objects 500 and there exists the risk that during a subsequent retrieval operation outdated sub blocks 600 would be retrieved. The version number allows an efficient mechanism for handling such a scenario, for example by instructing the controller node 20 in such a situation to retrieve the metadata from the local metadata storages 920 to only add the metadata to the central metadata storage 910 that comprises the highest version number. It is clear that alternative versioning number schemes are available, such as for example a lampert clock or other suitable versioning number scheme which allow distributed subsystems of the distributed object storage system 1 to update the version number without requiring an atomic operation and still allow the most recent version number to be identified.

As explained above, the metadata storage 900 allows the controller node 20 to determine on which storage elements 30 sub blocks 600 of a particular data object can be retrieved. This can be done with high efficiency when consulting the central metadata storage 910. However for additional robustness, for example at times when the central metadata store 910 is not available or during the process of rebuilding the central metadata store 910, a federated search of one or more of said local metadata storages 920 on the storage nodes 30. This federated search can use a set of rules and heuristics to quickly locate the metadata of specific data objects or it can us an exhaustive search. During such a federated search, according the embodiment of FIGS. 8 and 9, when searching for metadata for data object C, the local metadata storage 920.1-3 of the respective storage nodes 30.1-30.3 will be consulted. When consulting metadata storage 920.1 of storage node 30.1 no metadata will be found relating to data object C, however the metadata available for data objects A and B can for example be stored for rebuilding the central metadata storage 910 or cached for future federated searches. When consulting the local metadata storage 920.2 metadata for data object C will be retrieved, which will contain all storage elements 30 that store sub blocks 600 relating to data object C.

In order to still further enhance robustness for metadata availability there is made use of the version number as explained above. In this way the central metadata storage 910 can be verified and updated to the most recent state of the distributed object storage system 1. During the federated search the controller node 20 then retrieves metadata of the local metadata storages 920 and adds the metadata for each data object 500 that comprises the highest version number to the central metadata storage 910.

It is clear that according to still further embodiments of the metadata storage 900, the metadata stored for a data object 500 could comprise other suitable entries comprising properties of the data object 500, such as for example the state of the data object 500, which could for example comprise an indication whether the data object 500 was subject to a delete operation.

Several advantageous embodiments of the monitoring agent 710 for the distributed object storage system 1 according to the invention will now be described. Such a monitoring agent 710 identifies data objects 500 stored in the distributed object storage system 1 in need of repair and adds their data object identifier as a repair data object identifier to a repair task that then is available for processing by the maintenance agent. According to one embodiment the monitoring agent 710 is operable to monitor availability of a data object by instructing the clustering module 420 to retrieve all stored sub blocks 600 for this data object 500, this means an amount of sub blocks 600 for this data object 500 that corresponds to said predetermined number of x*n=800*16=12800. If at least one of these stored sub blocks cannot be retrieved, that means that only an amount of less than said predetermined number x*n=800*16=12800 can be retrieved, the monitoring agent 710 will provide the data object identifier of this data object as a repair data object identifier, a corresponding repair task is created. These repair tasks can then be aggregated in a repair task list for further processing by the maintenance agent 740. According to one embodiment such a repair task list could be implemented by marking a data object for repair in the metadata storage 900 as shown in more detail in FIG. 8. In the column 'REPAIR' it is schematically indicated when a data object is marked for repair if a '1' is present in this column, a '0' is present if no repair is needed. As such the repair task list can be created by filtering the metadata for all data object identifiers for which a '1' is present in the column 'REPAIR'. Marking a data object for repair can be accomplished by setting the value in the 'REPAIR' column from '0' to '1'. Checking all data objects stored in a distributed object storage system 1 could be performed by one or more monitoring agents 710 on a periodic basis. In one, there could be a monitoring agent 710 available in each storage node 30 which checks all data objects stored in this storage node 30 by checking all objects for which a data object identifier is available in its local metadata storage 920, for example every one to ten days. This could be combined with a monitoring agent 710 running on the controller node checking all data objects available in the central metadata storage 910 every ten to thirty days. According to another embodiment, it is possible to have available multiple namespaces, this is a defined collection of data objects sharing common properties in order to allow for sufficient scalability, a periodic check can be performed on all data objects contained in a specific namespace, for example once every thirty to sixty days.

According to an alternative embodiment, instead of checking whether all the sub blocks 600 for a specific data object are available, the monitoring agent 710 determines from the metadata storage on what storage elements 300 the data object 500 is stored and subsequently checks whether the status of these storage elements 300 for their availability. If one of these storage elements is not available, the data object is marked for repair as explained above.

According to a further embodiment of the monitoring agent 710, could be triggered during storage or retrieval operations, for example if the spreading module or clustering module determines that not all generated or stored sub blocks for a data object can be stored or retrieved correctly. The monitoring agent can then mark this data object for repair as explained above.

According to still a further embodiment of the monitoring agent 710, on a periodic basis checking the status of the storage elements 300 of the distributed object storage system 1. If a storage element 300 is detected of which the status indicates it is unavailable, repair data object identifiers can be provided for data objects of which sub blocks 600 are stored on this storage element 300. This can be done by marking all data objects mentioning this storage element in the central metadata storage 910 or local metadata storage 920 for repair.

In order to still further improve efficiency of the monitoring agent the monitoring agent 710 after checking the status of the storage elements 300 could store the status of these storage elements 300 in a central infrastructure database. This central infrastructure database could be implemented as any type of programmable storage structure for example in the memory 230 of the controller node 20. The central infrastructure database could store infrastructure metadata comprising an identifier of the storage elements and the status of these storage elements 300. Subsequently the monitoring agent 710 could mark all data objects 500 for repair of which sub blocks 600 are stored on a storage element of which the infrastructure metadata indicates it is unavailable. This can for example be implemented by combining both the metadata of the data objects and the infrastructure metadata of said storage elements.

This central infrastructure database could also be used to increase the efficiency of the repair retrieval operation. For example, when the maintenance agent 740 instructs the clustering module to retrieve said predetermined number of sub blocks comprising said repair data object identifier, is operable to further instruct said clustering module to consult said central infrastructure database. During the subsequent retrieval of number of stored sub blocks equal to or greater then said predetermined multiple of said minimal spreading requirement x*k=800*10=8000, the clustering module 430 will exclusively consult storage elements 300 of which the status in said infrastructure metadata indicates they are available. In this way no time and network traffic is lost on accessing unavailable storage elements 300 or on waiting for sub blocks 600 that are unavailable.

The infrastructure database allows the state of all storage elements 300 used in the distributed object storage system 1 to be centrally recorded. Possible states for such a storage element 300 are for example active, offline, abandoned, or some other state. The monitoring agent can for example on a periodic basis contact each of the storage nodes 30 to get current status of each of their storage elements 300, these storage elements being for example hard disk drive. Each storage node 30 can periodically assess the quality of its these hard disk drives by for example obtaining the SMART disk information, by doing explicit disk tests or by keeping its own log of read and write errors or by using some other methods. Once the state of these hard disk drives is determined the storage node 30 can report this to the central infrastructure database comprising a list of hard disk statuses. When the quality of a storage element 300 becomes suspicious the operator is alerted and is given a choice to either put the storage element back into service or mark it as abandoned. Alternatively the system can decide automatically, based on policies to abandon a storage element 300. Once a storage element 30 is marked abandoned it will not be used for further storage or retrieval operations and it can be powered down to conserve energy use.

Alternatively instead of monitoring the state of the storage elements 30 of the distributed object storage system 1, the monitoring agent could monitor the availability of all storage nodes 30 and record this centrally in the infrastructure database. A storage node 30 can be available or unavailable or some other state. According to one embodiment a monitoring agent 710 running on a storage node 30 can record the availability of this storage node 30 in the central infrastructure database. Whenever a storage node 30 becomes unavailable for a certain length of time, an operator could be alerted and can be requested to take action. The action could be to put the storage node 30 back online or to remove it from the distributed object storage system 1. Alternatively the distributed object storage system 1 could decide automatically, based on policies, to remove a storage node 30 that is unavailable. Once a storage node 30 is removed from the distributed object storage system 1, all the storage elements 300 it comprises can be marked as abandoned.

Figure 10:
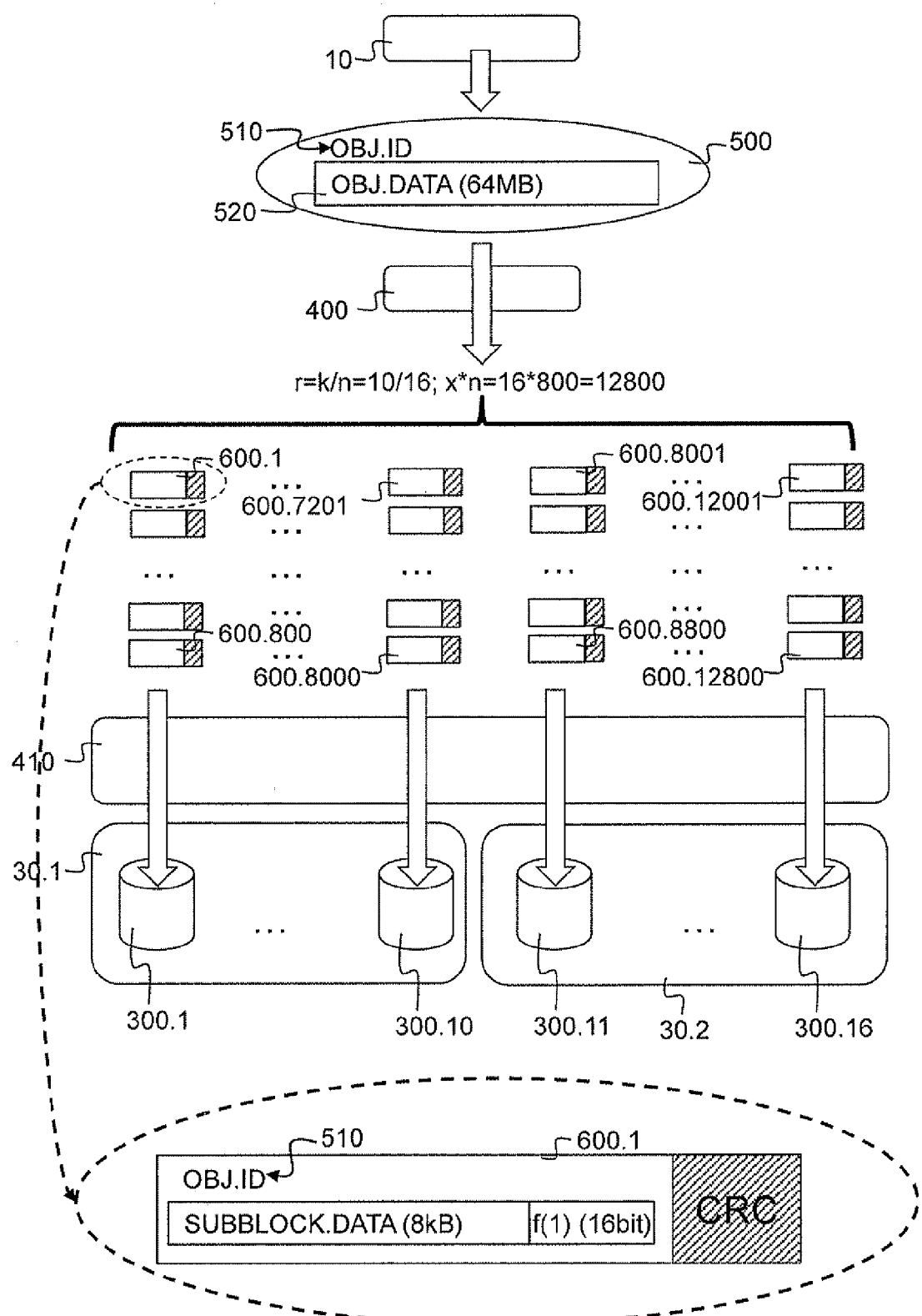
FIG. 10 schematically illustrates the storage operation according to an alternative embodiment of the invention.

According to still a further embodiment of the distributed object storage system 1, as shown in FIG. 10, the encoding module 400 will calculate for every sub block 600 a corresponding checksum, such as for example a cyclic redundancy check or CRC, or alternative checksum implementations such as MD5, SHA1, SHA128, SHA256, etc during disassembly of the data object 500 during a storage operation. As such there will now be available a predetermined number of sub blocks 600 and a predetermined number of checksums of these sub blocks 600. The spreading module 410 subsequently stores this predetermined number of checksums together with their corresponding redundant sub blocks 600 on the storage elements 300. These checksums now allow for an embodiment of a monitoring agent 710 to assess data consistency of the distributed object storage system 1. This means that for example on a periodic basis, for example on a regular interval on a per name space basis, a monitoring agent 710 can determine the consistency of all the data objects 500 stored by checking per stored data object 500, whether the stored checksum of all of the stored sub blocks 600 of these data objects 500 corresponds with a recomputed checksum of each of the stored sub blocks 600. If at least one of the sub blocks 600 is stored on a storage element 300 together with an invalid checksum, the corresponding data object 500 can be marked for repair as explained above. In order to have a scalable approach, the distributed object storage system 1 could comprise a plurality of such monitoring agents 710 running locally on its storage nodes 30 in order to distribute the work load. The policy for periodic consistency checks can for example specify that all data objects 500 stored in the distributed object storage system 1 need to be checked every 30 days on a per name space basis. In such a case, each of the monitoring agents 710 running locally on a storage node, will check $1/30^{th}$ of all sub blocks 600 stored on its storage node for consistency. If, for some reason, the sub blocks 600 that were scheduled for consistency checking could not be processed that day, these will be added to the schedule for the next day.

According to still a further embodiment the encoding module 400 will calculate for a group of consecutive sub blocks 600 a single checksum. Such a group could comprise for example 16 or 32 or any other suitable number of consecutive sub blocks 600, such as for example sub blocks 600.1-600.16. This allows for a performance optimisation as less checksums need to be generated, verified and stored, while compromising the efficiency of repair only slightly, because when an invalid checksum is detected the number of missing sub blocks 600 will be equal to that of the number of sub blocks 600 in the corresponding group of sub blocks 600. So this will slightly increase the number of missing sub blocks in the case that only part of the sub blocks contained in this group would be really in need of repair. However the repair process would still not require to know which exact sub blocks 600 were in need of repair, it only needs to be informed of the number of missing sub blocks 600, which in this embodiment would always be a multiple of the number of sub blocks in such a group.

According to still a further embodiment according to the invention, the distributed object storage system 1 comprises a garbage collection agent in order to still further improve reliability and to optimize long term storage capacity. The garbage collection agent can be implemented as programming instructions stored in local memory 230 of the controller node 20 for execution by its processor 220 or alternatively in local memory 330 of one or more of the storage nodes 30 for execution by their processor 320 or any other suitable combination. During the life time of the distributed object storage system 1 there is a probability that a certain number of sub blocks 600 will come into existence that are no longer associated to a stored data object 500, for example as the result of an incomplete delete operation or an error during a storage operation. These stored sub blocks 600, for which there is for example no corresponding data object 500 available anymore in the metadata storage 900, are considered to be garbage and it is preferred to remove them from the storage elements 300 in order to make available the storage capacity they consume. During a garbage collection operation, the garbage collector agent must be connected to or active on the respective storage nodes 30. The garbage collection operation could be scheduled on a periodic basis and could generally comprise these steps:

retrieving the object identifier of at least one of the sub blocks 600 stored on a storage element 300;

verifying whether the data object 500 corresponding to this retrieved object identifier corresponds to a data object 500 stored in the distributed object storage system; and removing the sub blocks of which this verification indicates that the corresponding data object 500 is not stored in the distributed object storage system 1.

According to one embodiment of the garbage collection agent, the verification can be accomplished by simply checking whether the retrieved object identifier is present in the central metadata storage 910 or the local metadata storage 920 of the storage node 30 storing the sub block 600 being checked. This allows for a distributed approach to garbage collection and enables to have a plurality of garbage collection agents running in parallel, for example one on each storage node 30 of the distributed object storage system 1. According to still further embodiments in order to achieve performance optimisations the garbage collection agent could be configured to only check sub blocks or data objects that are older than a certain date or that have not been updated or accessed for a predetermined amount of time. It is clear that numerous alternative scenarios are available to the person skilled in the art in order to increase the chance of checking a relevant subset of sub blocks or data objects, such as for example older or inactive sub blocks or data objects instead of newer or active ones.

According to an alternative embodiment of the garbage collection agent, on a regular basis form the central metadata storage a central list is generated, by a central garbage collection agent, of all data objects 500 stored in the distributed object storage system 1. Subsequently, based on this central list, for each storage node 30, a plurality of local lists is generated of all data objects 500 of which sub blocks are stored on a specific storage node 30. These local lists are then subsequently sent to the respective storage nodes 30 where they are processed by a local garbage collection agent. These local garbage collection agents, after receiving the local list, will create a check list comprising all data object identifiers mentioned by the sub blocks 600 stored on their storage node 30. The local garbage collection agents will subsequently compare their local list and check list and identify all sub blocks for which a data object is present in the check list but not in the local list. These sub blocks 600 can then be considered garbage as explained above and can be removed from the storage node 30 in order to make available the storage capacity they consume. During this comparison the garbage collection agent could optionally mark the data objects 500 which are available in the local list, but not in the check list for repair as explained above. In order to cope with the time lag that might occur during the creation of the local list and the check list, it might be preferential to implement a time marker functionality into the distributed object storage system, such as providing a time stamp for every data object 500 stored in the system, which could for example be implemented as an entry for a creation timestamp, a last modification timestamp, etc. in the metadata storage 900 for each data object 500 stored. In this way a synchronization point could be created for the garbage collection operation, such that the risk, that for example sub blocks corresponding to new data objects that were stored in the system during the creation of the local lists and/or check list would be considered as garbage, can be mitigated.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A distributed object storage system, comprising:

a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, wherein said desired spreading width consists of the sum of:

a minimal spreading requirement, corresponding to the minimal number of storage elements that must store sub blocks of said data object and are not allowed to fail; and a maximal concurrent failures tolerance, corresponding to the number of storage elements that must store sub blocks of said data object and are allowed to fail concurrently;

each one of said redundant sub blocks comprising:
  encoded data of equal size of the data object divided by a factor equal to said predetermined multiple of said minimal spreading requirement; and
  decoding data, such that said data object can be decoded from any combination of said redundant sub blocks of which the number corresponds to predetermined multiple of said minimal spreading requirement;
a plurality of storage nodes each comprising a share of said plurality of redundant storage elements; and
at least one controller node, operably connected to or comprised within said storage nodes when storing or retrieving said data object, comprising:
  an encoding module operable to disassemble said data object into said predetermined number of redundant sub blocks;
  a spreading module operable to store said predetermined number of said redundant sub blocks on a number of said storage elements larger or equal to said desired spreading width;
  a clustering module operable to retrieve at least said predetermined multiple of said minimal spreading requirement of said redundant sub blocks from a plurality of said storage elements; and
  a decoding module operable to assemble said data object from any combination of said redundant sub blocks of which the number corresponds to said predetermined multiple of said minimal spreading requirement,
a monitoring agent, operably connected to said storage nodes when monitoring said data object, and operable to:
  provide a repair data object identifier of a repair data object, wherein said repair data object identifier corresponds to said data object identifier and said repair data object corresponds to said data object when said data object is not correctly stored in said distributed object storage system; and
  subsequently create a repair task comprising said repair object identifier,
and wherein:
the distributed object storage system further comprises a maintenance agent operably connected to said controller node when repairing said repair data object, and operable to perform the following steps when executing said repair task:
said maintenance agent determining said repair data object identifier comprised within said repair task;
said maintenance agent instructing said clustering module to retrieve said predetermined number of sub blocks comprising said repair data object identifier, said clustering module subsequently retrieving a number of collected sub blocks equal to or greater then said predetermined multiple of said minimal spreading requirement;
said maintenance agent determining a number of missing sub blocks which corresponds to the number of sub blocks said clustering module is not able to collect;
said maintenance agent instructing said decoding module to assemble said repair data object from said number of collected sub blocks;
said maintenance agent instructing said encoding module to disassemble said repair data object into a specific number of repair sub blocks, said specific number being equal to or greater than said number of missing sub blocks and less then said predetermined number of sub blocks; and
said maintenance agent instructing said spreading module to store said number of repair sub blocks, said spreading module subsequently storing said number of repair sub blocks, such that said repair sub blocks and said collected sub blocks are stored on a number of said storage elements that is larger or equal to said desired spreading width.

2. A distributed object storage system according to claim 1, wherein said specific number is equal to said number of missing sub blocks augmented by a safety margin.

3. A distributed object storage system according to claim 2, wherein said safety margin is equal to zero.

4. A distributed object storage system according to claim 3, wherein said controller node is operable to consult said metadata storage to determine on which storage elements said sub blocks of said data object can be retrieved, and said consultation is a consultation of said central metadata storage.

5. A distributed object storage system according to claim 1, wherein said distributed object storage system further comprises a metadata storage, said encoding module and/or said spreading module adding to said metadata storage and wherein metadata for said data object stored comprises:
  said data object identifier;
  a list of identifiers of the storage elements on which sub blocks of said data object are stored; and
  an identifier for the type of encoding that was used to disassemble said data object.

6. A distributed object storage system according to claim 5, wherein said controller node comprises a central metadata storage.

7. A distributed object storage system according to claim 6, wherein said spreading module is operable to add to said central metadata storage said metadata for each data object stored by said controller node.

8. A distributed object storage system according to claim 6, wherein said plurality of storage nodes each comprise a local metadata storage, said spreading module adding to said respective local metadata storage, and said metadata for each data object being stored in said corresponding storage node.

9. A distributed object storage system according to claim 8, wherein said metadata further comprises a version number that is incremented every time said data object is stored by said spreading module.

10. A distributed object storage system according to claim 9, wherein said controller node retrieves said metadata from said local metadata storages and adds the metadata for each data object comprising the highest version number to said central metadata storage.

11. A distributed object storage system according to claim 9, wherein said controller node is operable to consult said metadata storage to determine on which storage elements said sub blocks of said data object can be retrieved, and said consultation is a federated search of one or more of said local metadata storages, and wherein during said federated search said controller node retrieves said metadata of said local metadata storages that are consulted and adds said metadata for each data object comprising the highest version number to said central metadata storage.

12. A distributed object storage system according to claim 8, wherein said controller node is operable to consult said metadata storage to determine on which storage elements said sub blocks of said data object can be retrieved, and said consultation is a federated search of one or more of said local metadata storages.

13. A distributed object storage system according to claim 5, wherein said controller node is operable to consult said metadata storage to determine on which storage elements said sub blocks of said data object can be retrieved.

14. A distributed object storage system according to claim 5, wherein said distributed object storage system further comprises a garbage collection agent operably connected to said storage nodes when performing a garbage collection operation, and operable to perform the following steps during a garbage collection operation:
- retrieving the object identifier of at least one of said sub blocks stored on said storage element;
- verifying whether said data object corresponding to said retrieved object identifier corresponds to a data object stored in said distributed object storage system; and
- removing said sub blocks for which said verification indicates that said corresponding data object is not stored in said distributed object storage system.

15. A distributed object storage system according to claim 14, wherein said verification indicates that said corresponding data object is not stored in said distributed object storage system if said object identifier is not present in said metadata storage.

16. A distributed object storage system according to claim 1, wherein said monitoring agent is operable to monitor availability of said data object by:
- instructing said clustering module to retrieve said predetermined number of said redundant sub blocks; and
- providing said repair data object identifier if at least one of said redundant sub blocks cannot be retrieved.

17. A distributed object storage system according to claim 1, wherein said monitoring agent is operable to monitor availability of said data object by:
- checking the status of said storage elements; and
- providing said repair data object identifier if at least one of said redundant sub blocks is stored on a storage element of which the status indicates it is unavailable.

18. A distributed object storage system according to claim 1, wherein said monitoring agent is operable to monitor availability of said data object by:
- checking the status of said storage elements;
- storing the status of said storage elements in a central infrastructure database comprising infrastructure metadata, said infrastructure metadata comprising:
  - an identifier of each said storage element; and
  - the status of each said storage element (300),
- providing said repair data object identifier if at least one of said redundant sub blocks is stored on a storage element that the infrastructure metadata indicates is unavailable.

19. A distributed object storage system according to claim 18, wherein said maintenance agent, when instructing said clustering module to retrieve said predetermined number of sub blocks comprising said repair data object identifier, is operable to further instruct said clustering module to consult said central infrastructure database, said clustering module subsequently retrieving a number of stored sub blocks equal to or greater then said predetermined multiple of said minimal spreading requirement exclusively from said storage elements for which the status in said infrastructure metadata indicates availability.

20. A distributed object storage system according to claim 18 wherein said monitoring agent is operable to provide said repair data object identifier if at least one of said redundant sub blocks is stored on a storage element of which the infrastructure metadata indicates it is unavailable by combining both the metadata of said data object and the infrastructure metadata of said storage elements.

21. A distributed object storage system according to any of the preceding claims, wherein
- said encoding module is further operable to generate a predetermined number of checksums of said redundant sub blocks when disassembling said data object into said predetermined number of redundant sub blocks;
- said spreading module is further operable to store said predetermined number of checksums together with their corresponding redundant sub blocks on said storage elements; and
- said monitoring agent is operable to monitor availability of said data object by:
  - checking said checksums; and
  - providing said repair data object identifier if at least one of said redundant sub blocks is stored on a storage element together with an invalid checksum.

22. A distributed object storage method implemented on a distributed object storage system, said distributed object storage system comprising:
- a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, wherein said desired spreading width consists of the sum of:
  - a minimal spreading requirement, corresponding to the minimal number of storage elements that must store sub blocks of said data object and are not allowed to fail; and
  - a maximal concurrent failures tolerance, corresponding to the number of storage elements that must store sub blocks of said data object and are allowed to fail concurrently;
- each one of said redundant sub blocks comprising:
  - encoded data of equal size of the data object divided by a factor equal to said predetermined multiple of said minimal spreading requirement; and
  - decoding data, such that said data object can be decoded from any combination of said redundant sub blocks of which the number corresponds to predetermined multiple of said minimal spreading requirement;
- a plurality of storage nodes each comprising a share of said plurality of redundant storage elements; and
- at least one controller node, operably connected to or comprised within said storage nodes when storing or retrieving said data object, comprising:
  - an encoding module operable to disassemble said data object into said predetermined number of redundant sub blocks;
  - a spreading module operable to store said predetermined number of said redundant sub blocks on a number of said storage elements larger or equal to said desired spreading width;
  - a clustering module operable to retrieve at least said predetermined multiple of said minimal spreading requirement of said redundant sub blocks from a plurality of said storage elements; and
  - a decoding module operable to assemble said data object from any combination of said redundant sub blocks of which the number corresponds to said predetermined multiple of said minimal spreading requirement,
- a monitoring agent, operably connected to said storage nodes when monitoring said data object, and operable to:
  - provide a repair data object identifier of a repair data object, wherein said repair data object identifier corresponds to said data object identifier and said repair data object corresponds to said data object when said data object is not correctly stored in said distributed object storage system; and subsequently create a repair task comprising said repair object identifier, and a maintenance agent operably connected to said controller node when repairing said repair data object, and operable to perform the following steps when executing said repair task, said distributed object storage method comprising the steps of:

(a) said maintenance agent determining said repair data object identifier comprised within said repair task;

(b) said maintenance agent instructing said clustering module to retrieve said predetermined number of sub blocks comprising said repair data object identifier, said clustering module subsequently retrieving a number of collected sub blocks equal to or greater then said predetermined multiple of said minimal spreading requirement;

(c) said maintenance agent determining a number of missing sub blocks which corresponds to the number of sub blocks said clustering module is not able to collect;

(d) said maintenance agent instructing said decoding module to assemble said repair data object from said number of collected sub blocks;

(e) said maintenance agent instructing said encoding module to disassemble said repair data object into a specific number of repair sub blocks, said specific number being equal to or greater than said number of missing sub blocks and less then said predetermined number of sub blocks; and said maintenance agent instructing said spreading module to store said number of repair sub blocks, said spreading module subsequently storing said number of repair sub blocks, such that said repair sub blocks and said collected sub blocks are stored on a number of said storage elements that is larger or equal to said desired spreading width.

23. A distributed object storage method according to claim 22, wherein said specific number is equal to said number of missing sub blocks augmented by a safety margin.

24. A distributed object storage method according to claim 23, wherein said safety margin is equal to zero.

25. A distributed object storage method according to claim 24, further comprising the step of said controller node consulting said metadata storage to determine on which storage elements said sub blocks of said data object can be retrieved, said consultation being a consultation of said central metadata storage.

26. A distributed object storage method according to claim 22, wherein said distributed object storage system further comprises a metadata storage, said encoding module and/or said spreading module adding to said metadata storage and wherein metadata for said data object stored comprises:

said data object identifier;

a list of identifiers of the storage elements on which sub blocks of said data object are stored; and an identifier for the type of encoding that was used to disassemble said data object.

27. A distributed object storage method according to claim 26, wherein said controller node comprises a central metadata storage.

28. A distributed object storage method according to claim 27, further comprising the step of said spreading module adding to said central metadata storage said metadata for each data object stored by said controller node.

29. A distributed object storage method according to claim 27, wherein said plurality of storage nodes each comprise a local metadata storage, and further comprising the steps of said spreading module adding to said respective local metadata storage, and storing said metadata for each data object in said corresponding storage node.

30. A distributed object storage method according to claim 29, further comprising the step of incrementing a version number every time said data object is stored by said spreading module.

31. A distributed object storage method according to claim 30, further comprising the step of said controller node retrieving said metadata from said local metadata storages and adding the metadata for each data object comprising the highest version number to said central metadata storage.

32. A distributed object storage method according to claim 30, further comprising the step of said controller node consulting said metadata storage to determine on which storage elements said sub blocks of said data object can be retrieved, said consultation being a federated search of one or more of said local metadata storages, and wherein during said federated search said controller node retrieves said metadata of said local metadata storages that are consulted and adds said metadata for each data object comprising the highest version number to said central metadata storage.

33. A distributed object storage method according to claim 29, further comprising the steps of said controller node consulting said metadata storage to determine on which storage elements said sub blocks of said data object can be retrieved, said consultation being a federated search of one or more of said local metadata storages.

34. A distributed object storage method according to claim 26, further comprising the step of said controller node consulting said metadata storage to determine on which storage elements said sub blocks of said data object can be retrieved.

35. A distributed object storage method according to claim 26, wherein said distributed object storage system further comprises a garbage collection agent operably connected to said storage nodes when performing a garbage collection operation, and said garbage collection agent performing the following steps during a garbage collection operation:

retrieving the object identifier of at least one of said sub blocks stored on said storage element;

verifying whether said data object corresponding to said retrieved object identifier corresponds to a data object stored in said distributed object storage system; and removing said sub blocks for which said verification indicates that said corresponding data object is not stored in said distributed object storage system.

36. A distributed object storage method according to claim 35, wherein said verification indicates that said corresponding data object is not stored in said distributed object storage system if said object identifier is not present in said metadata storage.

37. A distributed object storage method according to claim 22, further comprising the step of said monitoring agent monitoring availability of said data object by:

instructing said clustering module to retrieve said predetermined number of said redundant sub blocks; and providing said repair data object identifier if at least one of said redundant sub blocks cannot be retrieved.

38. A distributed object storage method according to claim 22, further comprising the step of said monitoring agent monitoring availability of said data object by:

checking the status of said storage elements; and providing said repair data object identifier if at least one of said redundant sub blocks is stored on a storage element of which the status indicates it is unavailable.

39. A distributed object storage method according to claim 22, further comprising the step of said monitoring agent monitoring availability of said data object by:

checking the status of said storage elements;
storing the status of said storage elements in a central infrastructure database comprising infrastructure metadata, said infrastructure metadata comprising:
an identifier of each said storage element; and
the status of each said storage element (300),
providing said repair data object identifier if at least one of said redundant sub blocks is stored on a storage element that the infrastructure metadata indicates is unavailable.

40. A distributed object storage method according to claim 39, further comprising the step of said maintenance agent, when instructing said clustering module to retrieve said predetermined number of sub blocks comprising said repair data object identifier, further instructing said clustering module to consult said central infrastructure database, said clustering module subsequently retrieving a number of stored sub blocks equal to or greater then said predetermined multiple of said minimal spreading requirement exclusively from storage elements for which the status in said infrastructure metadata indicates availability.

41. A distributed object storage method according to claim 39, further comprising the step of said monitoring agent providing said repair data object identifier if at least one of said redundant sub blocks is stored on a storage element of which the infrastructure metadata indicates it is unavailable by combining both the metadata of said data object and the infrastructure metadata of said storage elements.

42. A distributed object storage method according to claim 22, further comprising the steps of
said encoding module generating a predetermined number of checksums of said redundant sub blocks when disassembling said data object into said predetermined number of redundant sub blocks;
said spreading module storing said predetermined number of checksums together with their corresponding redundant sub blocks on said storage elements; and
said monitoring agent monitoring availability of said data object by:
checking said checksums; and
providing said repair data object identifier if at least one of said redundant sub blocks is stored on a storage element together with an invalid checksum.

* * * * *